Jan. 21, 1969 A. MILLER ET AL 3,423,689

DIRECT CURRENT AMPLIFIER

Filed Aug. 19, 1965 Sheet 1 of 3

INVENTOR.
ARTHUR MILLER
MORTON H. LEVIN
BY
Charles A. Weigel, Jr.

DIRECT CURRENT AMPLIFIER

INVENTOR.
ARTHUR MILLER
MORTON H. LEVIN
BY Charles A. Weigel, Jr

INVENTOR.
ARTHUR MILLER
MORTON H. LEVIN
BY
Charles A. Weigel, Jr.

United States Patent Office 3,423,689

Patented Jan. 21, 1969

3,423,689

DIRECT CURRENT AMPLIFIER

Arthur Miller, Brookline, and Morton H. Levin, Natick, Mass., assignors to Hewlett-Packard Company, Palo Alto, Calif., a corporation of California Filed Aug. 19, 1965, Ser. No. 480,904
U.S. Cl. 330—69 5 Claims
Int. Cl. H03f *1/00*

ABSTRACT OF THE DISCLOSURE

The power supply voltage for a direct current differential amplifier is varied in accordance with the common mode signal applied to the amplifier to reduce common mode currents circulating within the amplifier.

This invention relates to direct current (DC) amplifiers and, more particularly, to a DC amplifier having provision for reducing the effect of unwanted common-mode voltages that often appear on its input terminals.

One of the major sources of inaccuracies encountered in data handling and measuring systems has been amplifier performance. With the advent of modern DC amplifiers it is now commonplace to make measurements of physical phenomena with overall accuracies approaching a fraction of one percent. The primary difficulties encountered with such amplifiers are no longer those of drift, gain accuracy, gain stability or linearity of the amplifier, but rather system noise arising from the use of "long" lines between transducer, amplifier and load and unavoidable grounding of the signal source at some point which is remote from the amplifier. Due to the physical separation of source, amplifier, and load, there is often a marked difference between the ground or reference potentials of each which results in current flow through a ground loop comprising the wiring between the system elements and the actual earth returns. This ground current causes an unwanted voltage generally termed the common-mode voltage, to appear on both input lines of the amplifier. This common-mode voltage which appears equally on both amplifier input lines, is to be distinguished from the normal-mode voltage which is the actual signal voltage developed by a transducer, or other signal source, between the input signal lines. The common-mode voltage may be either or both DC and alternating current (AC).

Many efforts have been made to either reduce these common-mode voltages or to reduce their effect upon the differential amplifiers typically employed in the system. Some of these efforts have been directed towards properly locating system ground connections. Other solutions have been based on complete isolation of the amplifier input terminals from ground by means of a transformer whose primary is connected to the signal source, while its secondary is connected to the grounded amplifier circuits. Since the signals to be amplified often cover a frequency spectrum which extends to DC, the transformer cannot transmit the signal directly, but a modulator of some kind must be inserted between the signal source and transformer primary. The modulation process converts the relatively low frequency input signal to a high frequency AC signal which can be handled by the transformer. The amplifier amplifies the AC signal, feeds it into a demodulator and filter whose output is supposed to be a replica of the original input.

While this approach does indeed provide good common-mode rejection, the band width of the amplifier is limited to a fraction of the frequency chosen for the carrier in the modulation process; the circuitry is relatively complex; and it is not possible, using only linear passive elements, to establish a tight overall feedback path back to the amplifier input without losing the input circuit isolation.

It is, therefore, an object of this invention to obviate many of the common-mode voltage problems encountered with the prior art DC amplifiers.

Another object of this invention is to provide an improved, low cost DC amplifier in which the effect of common-mode voltage is appreciably reduced.

A final object of this invention is to provide a common-mode voltage reducing circuit.

In accordance with this invention, the common-mode voltage on the input of a DC amplifier is sampled and superimposed on the amplifier's power supply voltage. In this manner all points in the amplifier are raised or lowered with the common-mode voltage and the ground loop current due to such voltage reduced almost to zero. This permits amplification of the normal-mode signal to the exclusion of the common-mode signal. Subsequent stages of amplification now may more easily amplify the normal-mode signal and reject the common-mode signal.

In one form of the invention the differential amplifier has a floating power supply whose floating ground, or isolated point of reference potential, is varied in accordance with the common-mode voltage appearing at the input terminals of the differential amplifier. The isolated reference potential of the power supply may be connected to be driven by a single-ended common-mode amplifier whose input samples the common-mode signal itself. The output of the differential amplifier may, as desired, be connected to either a balanced load or to a power amplifier which has a balanced, or differential input circuit. The power amplifier and the common-mode amplifier are both supplied by power supply which is grounded.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

Figure 1:
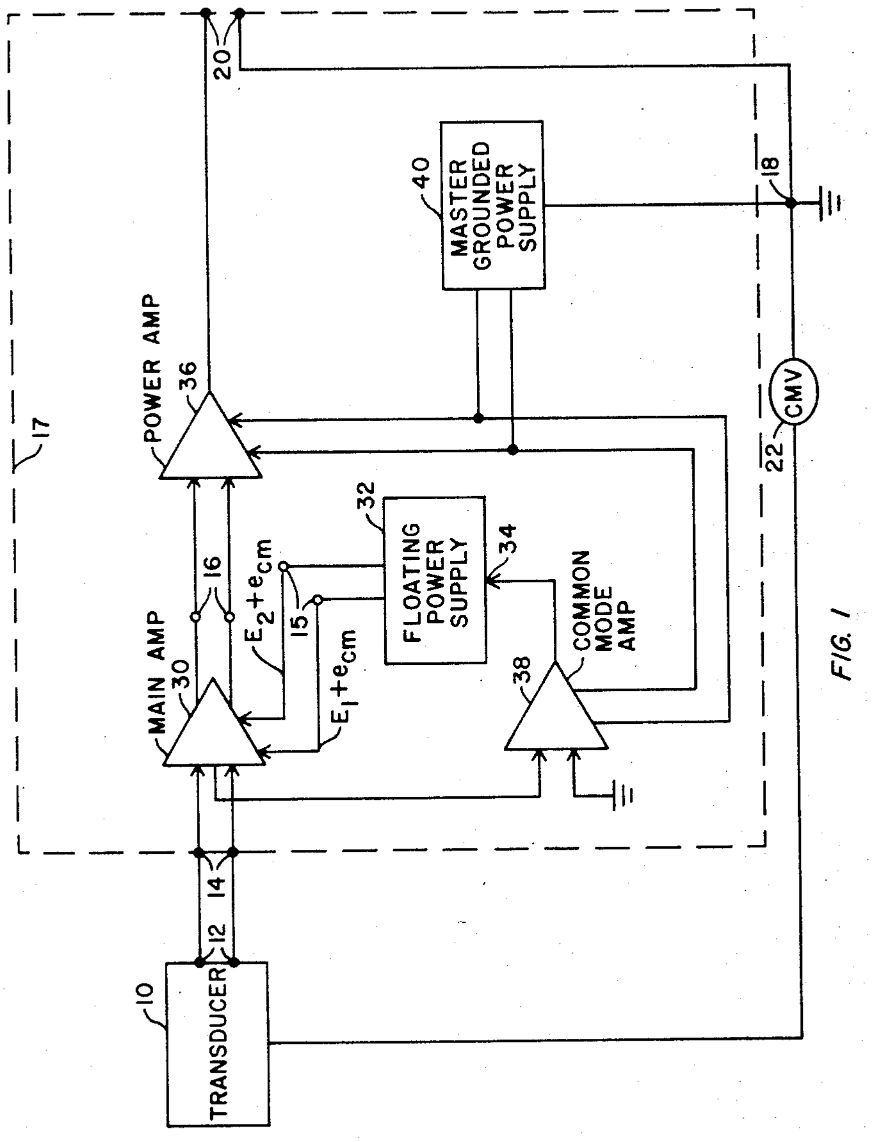
FIGURE 1 is a block representation of a DC amplifier system constructed in accordance with one embodiment of the invention.

In FIG. 1 there is shown a transducer 10 which may, for example, be a thermocouple, a strain gauge, or any other transducer element which converts a change in a physical phenomena to an electrical output signal having amplitude and polarity. The output terminals 12 of the transducer 10 are connected to the input terminals 14 of an amplifier 17 constructed in accordance with this invention. The amplifier 17 is connected to system ground at 18 and is illustrated as having a single-ended output terminals 20, although a balanced output may be used as desired.

Due to the typical physical separation of the amplifier ground 18 from the transducer 10, there often is created a noise or common-mode voltage, denoted by a single source 22 and designated CMV, between the system ground 18 and the transducer 10. This common-mode voltage appears equally on both input terminals 14 and, as is well understood, if it is not eliminated or compensated for, contributes to the amplitude of the amplifier output signal. The result is an error in the amplifier output signal which desirably should contain only the transducer or normal-mode signal with no components of the noise or common-mode voltage signal.

In accordance with one embodiment of this invention the effects of this common-mode voltage are reduced by connecting the input terminals 14 to a main differential amplifier 30 having a floating power supply 32. The floating power supply 32 has a floating ground, herein termed an isolated point of reference potential 34. The output of the main differential amplifier 30 is connected to what is illustrated as a balanced input, single-ended output, power amplifier 36 having an output connected to the output terminals 20. In the alternative the power amplifier 36 may have a balanced output.

The common-mode voltage signal appearing on the input terminals 14 of the main amplifier 30 is sampled by a single-ended common-mode DC amplifier 38 which is connected between the input circuit of the main amplifier 30 and the isolated point of reference potential 34 of the floating supply 32. Both the common-mode amplifier 38 and the power amplifier 36 receive electrical power from a conventional power supply 40 which is connected to the system ground 18.

In this manner any common-mode voltage appearing on the input terminals 14 is sampled by the common-mode amplifier 38 and employed to vary the potential of the reference point 34 of the floating power supply 32. If now the gain of the common-mode amplifier 38 is made to approach unity, the DC power supplied to the main amplifier 30 will have superimposed thereon a voltage signal that varies in amplitude in substantially the same manner as the common-mode voltage appearing on the input terminals 14. The voltages delivered to the main amplifier 30 can be written as $E_1+e_{cm}$ and $E_2+e_{cm}$, where $E_1$ and $E_2$ are the normal operating voltages required by the main amplifier 30, and $e_{cm}$ is the common-mode voltage superimposed on the power supply by virtue of the fact that the power supply is isolated from ground and connected to the common-mode amplifier.

The main differential amplifier 30 thus "sees" no common-mode voltage. Stated in another manner, if all points in the main amplifier 30 are raised or lowered in accordance with the common-mode voltage, the ground loop current due to common-mode voltage is reduced almost to zero and its effect substantially reduced. The common-mode amplifier serves to prevent undue loading of the signal circuit in the main amplifier 30 by the corrective circuit of this invention.

Since all points on the main amplifier 30, including its output terminals, 16, are at the common-mode voltage, it is seen that substantially all of this common-mode voltage reaches the input terminals of the output power amplifier 36, and this output amplifier must be able to discriminate against this common-mode voltage. This task, however, has been made easier in two ways by this invention. First, although the common-mode voltage has not been attenuated by the main amplifier 30, the differential signal or normal-mode voltage has been greatly amplified to the exclusion of the common-mode voltage. Thus, at output terminals 16 there is a composite signal in which the ratio of wanted to unwanted components is much more favorable than was the case at input terminals 14. Furthermore the output circuits of the main amplifier 30 represent a low impedance, symmetrical signal source for the power amplifier 36, regardless of the conditions in the original signal source such as transducer 10.

To avoid unduly loading the transducer 10, if the main amplifier 30 is a transistor amplifier, it is preferred to use a common emitter amplifier for the first stage in each channel of the differential amplifier and to extract the common-mode voltage from the reference end of the common emitter resistors by connecting them together and to the input of the common-mode amplifier 38. Other sampling points for the common-mode voltage, of course, will be apparent to those skilled in the art. For example, a summing network may be coupled across the input terminals 14.

Figure 2:
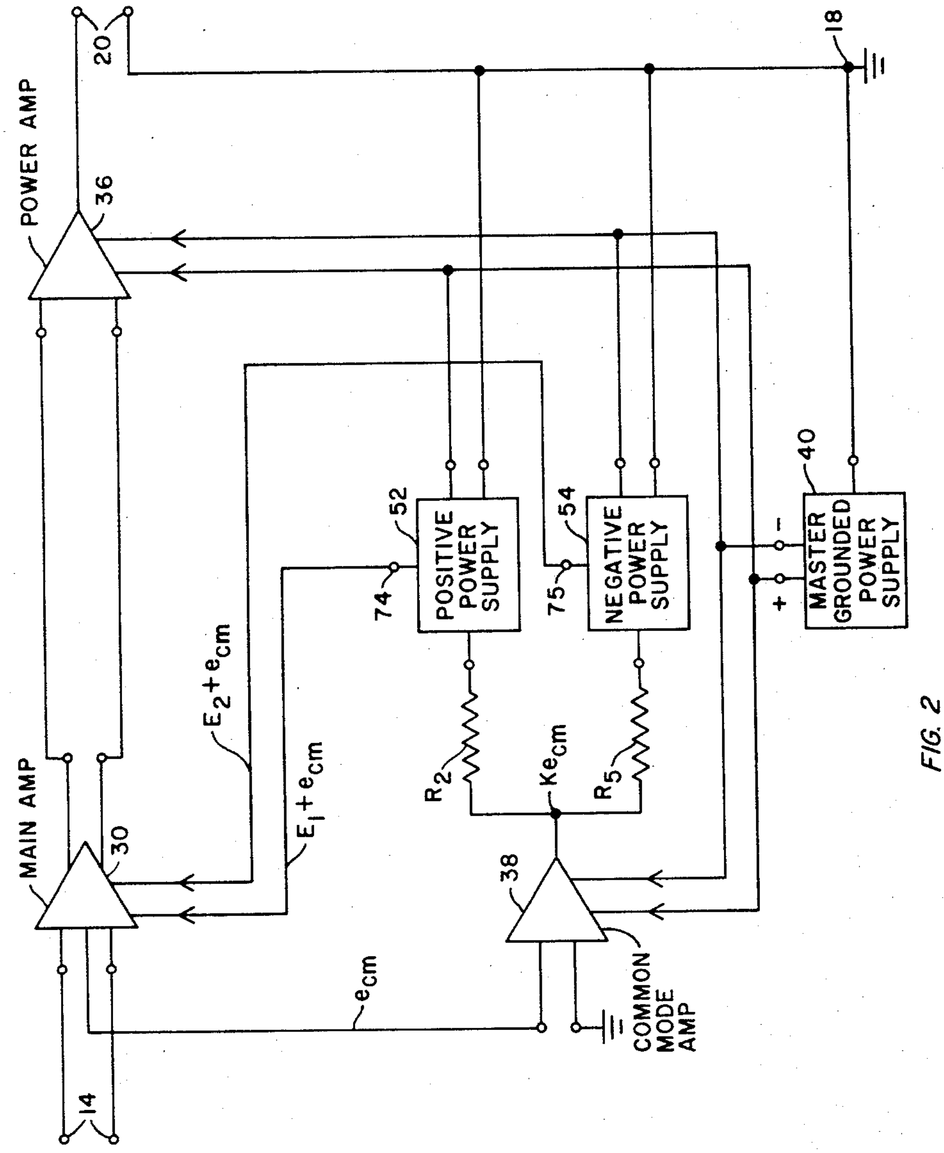
FIGURE 2 is a block diagram of a DC amplifier constructed in accordance with another embodiment of this invention.

Another embodiment of the invention, which avoids the use of a floating power supply, is illustrated in FIG. 2. The amplifier in FIG. 2 may be substituted directly for amplifier 17 of FIG. 1. The common-mode amplifier 38 samples the common-mode voltage appearing at the input of the differential amplifier 30. The output of the common-mode amplifier 38 is connected through respective resistors R2 and R5 to the control or reference input of conventional positive and negative voltage regulated power supplies 52 and 54, respectively. Any suitable power supply may be employed which can accept an unregulated direct current input voltage and a control or reference input signal at a control input 82 to provide an output which is closely proportional to the amplitude of the reference input signal. The outputs of the respective power supplies 52 and 54 appearing at terminals 74 and 75 are connected to the power input terminals of the amplifier 30.

The circuit operation is such as to superimpose upon the normal regulated output voltage $E_1$ and $E_2$, respectively, of the power supplies 52 and 54, the common-mode voltage $e_{cm}$. The amplifier 30 is driven in effect by the common-mode voltage in the same manner as the main amplifier 30 of FIG. 1. Hence, differential or normal-mode voltages will be amplified and the noise or common-mode signals will not. The main advantage of the circuit of FIG. 2 over that illustrated in FIG. 1 is that it avoids the use of a separate floating power supply as illustrated in the circuit of FIG. 1. The output of amplifier 30 in FIG. 2 is then applied to the differential output amplifier 36 which, in turn, feeds the output terminal 20. The overall performance is identical to that achieved by the circuit of FIG. 1.

Figure 3:
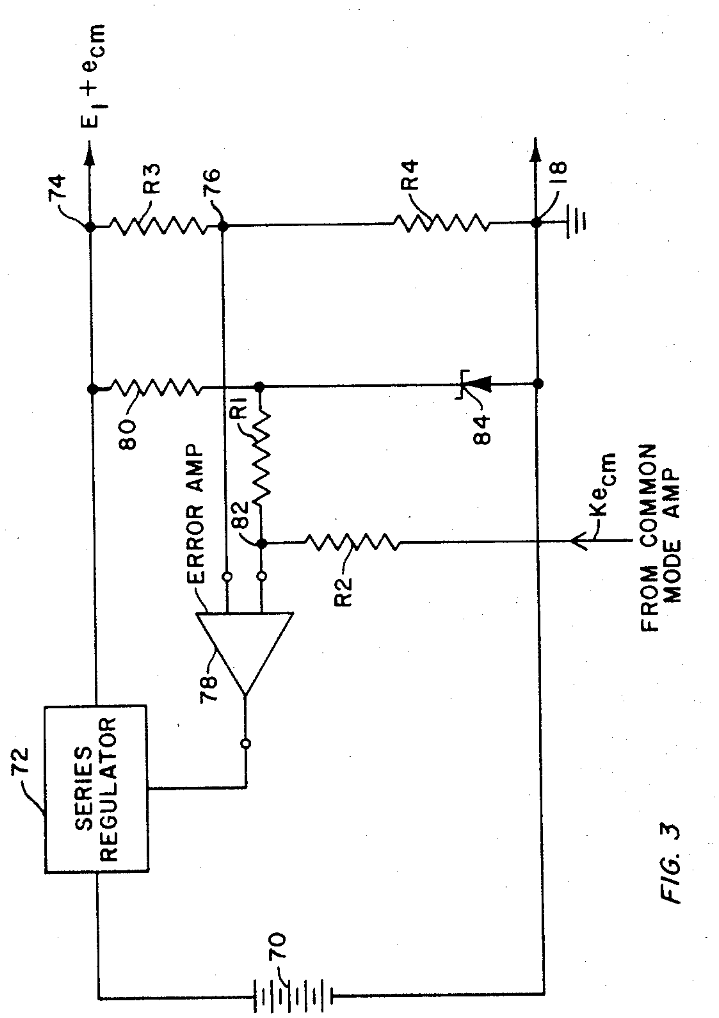
FIGURE 3 is a partial block and partial schematic representation of a controlled power supply that may be used in the amplifier of FIG. 2.

In FIG. 3 there is illustrated a regulated power supply that may be employed for the power supplies 52 and 54. The source of direct current voltage 40 illustrated as battery 70 is connected through a series regulator element 72, such as a transistor, to the output or load circuit denoted by the terminal 74. The negative terminal of the battery 70 is connected to a point of reference potential such as ground 18. A voltage divider comprising the serially-connected resistors R3 and R4 is connected between output terminal 74 and ground. The node 76 formed between the serially-connected resistors R3 and R4 is connected to one input of a differential error amplifier 78 the output of which controls the series regulator transistor 72. The output terminal 74 is also connected through a resistor 80 to the constant voltage element 84, usually a Zener diode. The voltage across the Zener diode 84 is mixed with the output of the common-mode amplifier by the resistors R1 and R2. The composite signal thus formed at their junction 82, contains both a constant component derived from the Zener diode and a variable component derived from the common-mode amplifier. It is this composite signal which is applied to the second input terminal of the differential error amplifier 78.

Ordinarily the Zener diode 84 or its equivalent provides a constant reference input voltage to the error amplifier 78 against which the output voltage appearing at the node 76 is compared to control the error amplifier and hence the series regulator 72 which controls the magnitude of the output voltage appearing across the output terminals 74–18. In such case the normal output voltage is constant and has a magnitude which is determined by the ratio of the divider resistors R3 and R4 and the values of the constant reference voltage reaching the summing point 82 of the error amplifier 78. Since the reference voltage applied to the error amplifier is now a composite signal containing a constant component derived from the Zener diode 84 and a variable component which is proportional to the output of the common-mode amplifier 38, the power supply output will therefore contain both a constant component $E_1$ or $E_2$ (FIG. 2) and a variable component $e_{cm}$. By proper choice of a Zener voltage level and the R1/R2 and R3/R4 ratios (or R1/R5 and R3/R4 ratios for the negative supply 54 (FIG. 2)) the respective power supply outputs will have the desired values of $E_1$ and $E_2$ that the amplifier 30 requires. Similarly by proper choice of these ratios and the gain of the common-mode amplifier 38 the value of the variable component $e_{cm}$ of the power supply output will be substantially equal to the common-mode voltage as required for the proper operation of this invention.

It is to be understood that the power supply illustrated in FIG. 3 is typical only of a suitable regulated power supply. Many other forms of this circuit are well known to those skilled in the art and a variety of mixing and control circuits may be employed which will apply the desired supply voltages to the amplifier which will contain a superimposed common-mode voltage component.

There has thus been described an improved system wherein the unwanted common-mode voltages appearing on the input signal lines is sampled and employed to vary proportionately the supply voltages at all points in at least the input portion of a DC amplifier to reduce the effects of such common-mode voltages. The result is an economical amplifier having a relatively high common-mode rejection.

What is claimed is:

1. A direct current differential amplifier including:
a pair of output terminals,
a common point of reference potential,
a pair of input terminals subject to receiving both normal and common mode input voltage signals with respect to said common point,
power supply means for supplying direct current voltage signals to said differential amplifier, and
combining means coupled to said power supply means and to a point in said differential amplifier intermediate said input and output terminals and responsive substantially only to said common mode input voltage signals for combining said common mode voltage signals with all of said direct current voltage signals, thereby to substantially prevent the circulation of currents in said amplifier due to said common mode signals.

2. An amplifier according to claim 1 wherein said power supply means includes an isolated point of reference potential and said combining means includes a common mode amplifier having an input terminal connected to said intermediate point and an output terminal connected to said isolated point of reference potential.

3. An amplifier according to claim 2 wherein said common mode amplifier has a voltage gain selected so that the common mode voltage signal is reproduced with essentially no change at said common mode amplifier output terminal.

4. An amplifier according to claim 1 wherein said power supply means includes voltage regulating means and is returned to said common point, and wherein said combining means includes a common mode amplifier having an input terminal connected to said intermediate point and an output terminal connected to said voltage regulating means, thereby to vary the direct current voltage signals supplied said differential amplifier from said power supply in accordance with said common mode voltage signal.

5. An amplifier according to claim 4 wherein said common mode amplifier has a voltage gain selected so that the common mode voltage signal is reproduced with essentially no change by said power supply means.

References Cited

UNITED STATES PATENTS

| | | | |
|---|---|---|---|
| 2,909,622 | 10/1959 | Bell et al. | 330—69 |
| 2,965,850 | 12/1960 | Jameson | 330—69 X |
| 2,977,547 | 3/1961 | Talambiras | 330—69 |
| 3,275,945 | 9/1966 | Walker et al. | 330—69 X |

NATHAN KAUFMAN, *Primary Examiner.*

U.S. Cl. X.R.

330—200